G. A. GOSS.
RIVET.
APPLICATION FILED MAR. 14, 1910.
968,551.
Patented Aug. 30, 1910.
Fig. 1.
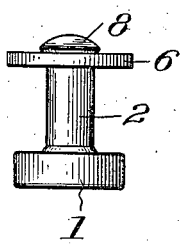
Fig. 3.
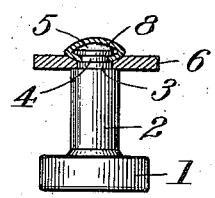
Fig. 2.
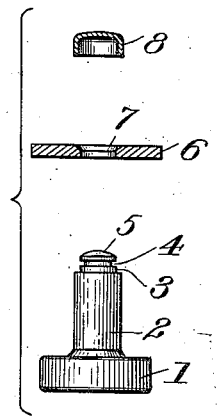
Fig. 4.
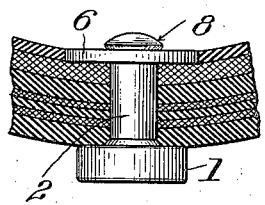
Fig. 5.
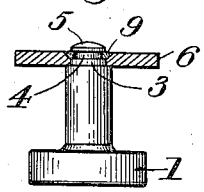
Fig. 6. Fig. 7.

Witnesses
C. H. Walker.
Lillie M. Perry.
Inventor
George A. Goss
by
M. W. Fincel
Attorney

UNITED STATES PATENT OFFICE.

GEORGE A. GOSS, OF WATERBURY, CONNECTICUT, ASSIGNOR TO SCOVILL MANUFACTURING COMPANY, OF WATERBURY, CONNECTICUT, A CORPORATION OF CONNECTICUT.

RIVET.

968,551.  Specification of Letters Patent.  Patented Aug. 30, 1910.

Application filed March 14, 1910. Serial No. 549,113.

*To all whom it may concern:*

Be it known that I, GEORGE A. Goss, a citizen of the United States, residing at Waterbury, in the county of New Haven and State of Connecticut, have invented a certain new and useful Improvement in Rivets, of which the following is a full, clear, and exact description.

Tires for use on the wheels of automobiles and other vehicles, have been provided with devices to prevent skidding, and among such devices are rivets or studs applied to the tread of the tires. Such rivets are of hardened metal, and a common practice is to make the rivets of steel and case-harden them. But this is not satisfactory, because the case-hardening strikes in only a little way, and is merely a film which soon wears off and thus exposes the soft part of the rivet to wear, and such wear is quite rapid. If the proper grade of steel were used, and the rivets were hardened all the way through, they would wear longer, but riveting them is not always satisfactory, because it is difficult to head the hard metal of the rivet over a washer, in view of the brittleness of the metal. And this same heading difficulty occurs to some extent with the case-hardened rivets.

To avoid the objections stated, and at the same time to obtain an efficient rivet that will stand the wear, and may be secured to the tire easily and without danger of breaking or splitting, is the object of this invention.

In carrying out the invention, the rivet is made of tool-steel or nickel-steel and hardened throughout. The shank of the rivet is made with a shoulder, and an undercut recess or groove above the shoulder, the shoulder being adapted to receive a washer, and the undercut recess or groove being adapted to receive a fastening device which is forced down over the shank and against the washer in such way as to firmly connect the washer and shank and thus secure the rivet in place.

An incidental advantage of this construction is that the inside of the tire is left comparatively smooth and free from any sharp or other surfaces that would injure the inflation tube or other part arranged within the outside tire.

In the accompanying drawings, illustrating the invention, in the several figures of which like parts are similarly designated, Figure 1 is an elevation showing the parts assembled. Fig. 2 is a partial section showing the parts ready to be assembled. Fig. 3 is a partial section showing the parts assembled. Fig. 4 is a sectional elevation showing the rivet applied to a tire. Fig. 5 is a partial section showing a modification. Fig. 6 is a plan view of a closed ring, and Fig. 7 is a plan view of an open ring that may be employed in the arrangement shown in Fig. 5.

The rivet comprises a head 1, and a shank 2, preferably made of tool-steel or nickel-steel, and if desired or necessary, hardened in any suitable manner, so as to get the best possible wearing effect. The end of the shank is provided with a shoulder 3, and above this shoulder is an undercut recess or groove 4, leaving an overhanging tip 5.

The rivet is passed through the tire or other article to which it is to be applied, as in Fig. 4, and then a washer 6 is placed upon the end of the shank so as to rest upon the shoulder 3. The hole in this washer is preferably countersunk at 7 on the outside. A cupped shell 8 of brass, or other suitable metal, is then placed over the tip 5 and by means of a suitable tool it is crowded down against the washer, the countersunk portion of which closes in the edges of the shell into the undercut recess, firmly connecting the shell with the tip of the shank, and producing an end on the tip larger than the hole in the washer, and firmly connecting the washer with the shank of the rivet, and, consequently, firmly connecting the rivet and the article to which it is applied.

Instead of using a cupped shell, I may use a ring 9, as shown in Fig. 5, and this ring is crowded into the undercut recess and countersunk hole of the washer and serves to connect the washer and rivet. This ring may be made of sheet-metal or wire, either closed as in Fig. 6, or open as in Fig. 7. The ring may be swaged into the undercut portion or groove, or otherwise fixed to the rivet.

By the use of the cupped shell or wire, the rivet is fastened in place with a smooth surface, as compared with the ordinary clenching of rivets heretofore commonly practiced; and, moreover, there is absolutely no liability of the end of the shank of the rivet being broken or deformed. Further, the shank of the rivet is not upset and the rivet not otherwise deformed in the act of setting it. The auxiliary attaching medium, whether the shell or ring, takes the place of such upsetting or deformation, and securely fixes the rivet in place.

What I claim is:—

1. A rivet, having a head and a shank, and a medium for attaching the rivet to an article, said attaching medium comprising a washer applied to the shank and a washer-attaching auxiliary made separate from the washer and shank and immovably engaging the washer and the end of the shank on the outer side of the washer.

2. A rivet, having a head, a shank, a shoulder on said shank, and an undercut recess or groove next to the shoulder, combined with a washer, and means separate from the washer and shank and applied to the shank next to the rivet, and adapted to be forced in the undercut recess or groove.

3. A rivet, having a head, and a shank, said shank adapted to receive a washer and said washer having a countersunk hole by which it is placed upon the shank, and a cupped shell adapted to be closed in over the end of the shank and against the washer and within the countersunk hole in said washer.

In testimony whereof I have hereunto set my hand this 12th day of March A. D. 1910.

GEORGE A. GOSS.

Witnesses:
G. F. HODGES,
L. H. BASSETT.